[12] United States Patent
Kakuta (10) Patent No.: US 10,655,529 B2
(45) Date of Patent: May 19, 2020

(54) ENGINE SYSTEM

(71) Applicant: TOYOTA JIDOSHA KABUSHIKI KAISHA, Toyota-shi, Aichi-ken (JP)

(72) Inventor: Yushi Kakuta, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 259 days.

(21) Appl. No.: 15/819,546

(22) Filed: Nov. 21, 2017

(65) Prior Publication Data

US 2018/0179946 A1 Jun. 28, 2018

(30) Foreign Application Priority Data

Dec. 26, 2016 (JP) .................................. 2016-251012

(51) Int. Cl.
*F02B 29/04* (2006.01)
*F01P 7/16* (2006.01)
(Continued)

(52) U.S. Cl.
CPC ............ *F02B 29/0443* (2013.01); *F01P 5/10* (2013.01); *F01P 7/16* (2013.01); *F01P 7/167* (2013.01);
(Continued)

(58) Field of Classification Search
CPC .... F02B 29/0443; F02M 26/06; F02M 26/21; F01P 5/10; F01P 7/16; F01P 7/167;
(Continued)

(56) References Cited

U.S. PATENT DOCUMENTS 6,244,256 B1 * 6/2001 Wall ..................... F02B 29/0425
60/605.2
6,394,210 B2 * 5/2002 Matsuda ............. F02B 29/0443
180/68.1
(Continued)

FOREIGN PATENT DOCUMENTS

JP 60261931 A * 12/1985 .............. F01P 7/162
JP 60261932 A * 12/1985 .............. F01P 7/162
(Continued)

*Primary Examiner* — Thai Ba Trieu
(74) *Attorney, Agent, or Firm* — Sughrue Mion, PLLC (57) ABSTRACT

An engine system includes an internal combustion engine, a compressor, a high-temperature coolant circulation circuit, a low-temperature coolant circulation circuit, an intercooler, and an electronic control unit. The intercooler is configured to transfer heat of the high-temperature coolant to the low-temperature coolant via intake air. An in-compressor passage of the compressor is arranged in the low-temperature coolant circulation circuit at a location at which the low-temperature coolant that exits from an in-cooler low-temperature water passage during a predetermined period from beginning of cold start is introduced into the in-compressor passage without passing through a low-temperature radiator. The electronic control unit is configured to increase the flow rate of the low-temperature coolant that flows through the low-temperature coolant circulation circuit during the predetermined period as compared to the flow rate after the predetermined period.

7 Claims, 6 Drawing Sheets

(51) Int. Cl.
*F02M 26/06* (2016.01)
*F02M 26/21* (2016.01)
*F01P 5/10* (2006.01)
*F01P 5/12* (2006.01)
*F01P 3/18* (2006.01)
*F01P 7/14* (2006.01)

(52) U.S. Cl.
CPC ............ *F02M 26/06* (2016.02); *F02M 26/21* (2016.02); *F01P 2003/182* (2013.01); *F01P 2005/105* (2013.01); *F01P 2007/146* (2013.01); *F01P 2060/02* (2013.01); *F01P 2060/12* (2013.01); *Y02T 10/146* (2013.01)

(58) Field of Classification Search
CPC ........... F01P 2003/182; F01P 2005/105; F01P 2007/146; F01P 2060/02; F01P 2060/12; Y02T 10/144; Y02T 10/146
USPC ......... 60/599, 605.2; 123/41.02, 41.08, 41.1, 123/41.12
See application file for complete search history.

(56) References Cited

U.S. PATENT DOCUMENTS

| | | | | |
|---|---|---|---|---|
| 8,365,527 B2* | 2/2013 | Raab | .................. | F02B 29/0443 60/599 |
| 8,375,926 B2* | 2/2013 | Sheidler | .............. | F02B 29/0418 123/559.1 |
| 8,826,893 B2* | 9/2014 | Marsh | ................. | F02B 29/0443 60/599 |
| 8,869,757 B2* | 10/2014 | Kim | .................... | F02B 29/0443 123/41.12 |
| 2006/0157000 A1* | 7/2006 | Lutze | ..................... | F01P 7/167 123/41.02 |
| 2010/0293943 A1* | 11/2010 | Teng | ....................... | F02M 26/24 60/605.2 |
| 2011/0005475 A1* | 1/2011 | Kardos | ............... | F02B 29/0443 123/41.08 |
| 2013/0298554 A1* | 11/2013 | Sellnau | ................... | F01P 7/165 123/41.08 |
| 2014/0075936 A1* | 3/2014 | Teng | ....................... | F02M 26/24 60/605.2 |
| 2016/0003127 A1* | 1/2016 | Sakagawa | ........... | F02B 29/0443 123/41.1 |
| 2016/0265458 A1* | 9/2016 | Okada | .................... | F02M 26/06 |
| 2016/0318499 A1* | 11/2016 | Yamanaka | ................ | F01P 5/10 |
| 2018/0023457 A1* | 1/2018 | Kimura | ............... | F02B 29/0443 123/563 |
| 2018/0086174 A1* | 3/2018 | Bidner | ................ | F02B 29/0443 |
| 2018/0086175 A1* | 3/2018 | Bidner | ................ | F02B 29/0443 |
| 2018/0087450 A1* | 3/2018 | Karnik | ................ | F02B 29/0443 |
| 2018/0087451 A1* | 3/2018 | Bidner | ................ | F02B 29/0493 |
| 2018/0163607 A1* | 6/2018 | Uto | ........................ | F02B 29/0443 |
| 2019/0077214 A1* | 3/2019 | Bidner | ................ | F02B 29/0443 |

FOREIGN PATENT DOCUMENTS

| | | |
|---|---|---|
| JP | 2013-096357 A | 5/2013 |
| JP | 2014-122582 A | 7/2014 |
| JP | 2014-202171 A | 10/2014 |

\* cited by examiner

ENGINE SYSTEM

INCORPORATION BY REFERENCE

The disclosure of Japanese Patent Application No. 2016-251012 filed on Dec. 26, 2016 including the specification, drawings and abstract is incorporated herein by reference in its entirety.

BACKGROUND

1. Technical Field

The disclosure relates to an engine system and, more particularly, to an engine system including a water-cooled compressor that supercharges intake air.

2. Description of Related Art

For example, Japanese Patent Application Publication No. 2014-122582 (JP 2014-122582 A) describes a turbocharger including a compressor that supercharges intake air into an internal combustion engine. The housing of the compressor has a coolant passage for cooling the compressor.

SUMMARY

In an internal combustion engine including a compressor that supercharges intake air, at least one of EGR gas and blow-by gas can be introduced into an intake passage upstream of the compressor. In the early stage after the beginning of cold start, an intake air temperature at the outlet of the compressor is low because the temperature of the compressor is low. As a result, the wall temperature of an intake passage downstream of the compressor is low. As EGR gas, or the like, is introduced to an intake passage upstream of the compressor in this state, moisture contained in the EGR gas, or the like, is cooled on the wall face of the intake passage downstream of the compressor. As a result, there is a concern that the moisture condenses and condensed water is produced.

In order to reduce production of the above-described condensed water, it is conceivable that the temperature of the compressor is quickly increased by utilizing high-temperature coolant flowing inside the internal combustion engine (water jacket). However, if high-temperature coolant is utilized, there is a concern that the temperature of the compressor excessively increases at the time when the internal combustion engine is operated at a high load. When the temperature of the compressor excessively increases, HC components contained in EGR gas, or the like, are warmed by high-temperature intake air supercharged by the compressor. As a result, there is a concern that HC components accumulate as a deposit on the wall face of the intake passage inside the compressor and the wall face of the intake passage downstream of the compressor.

The disclosure provides a controller for an internal combustion engine, which, in the case where a water-cooled compressor is employed, achieves both a reduction in production of condensed water in an intake passage downstream of the compressor and a reduction in accumulation of a deposit in an intake passage inside the compressor and downstream of the compressor.

An aspect of the disclosure provides an engine system. The engine system includes an internal combustion engine, a compressor, a high-temperature coolant circulation loop, a low-temperature coolant circulation loop, an intercooler and an electronic control unit. The compressor is arranged in an intake passage downstream of a location at which at least one of EGR gas and blow-by gas is introduced. The compressor is configured to supercharge intake air of the internal combustion engine. The high-temperature coolant circulation loop is one of two-line coolant circulation loops through which coolants having different temperatures flow. The high-temperature coolant circulation loop includes a high-temperature water pump and a high-temperature radiator. The high-temperature water pump is configured to circulate high-temperature coolant. The high-temperature coolant is coolant for cooling a water jacket of the internal combustion engine. The high-temperature radiator is configured to cool the high-temperature coolant. The low-temperature coolant circulation loop is one of the two-line coolant circulation loops. The low-temperature coolant circulation loop includes a low-temperature water pump and a low-temperature radiator. The low-temperature water pump is configured to circulate low-temperature coolant. The low-temperature coolant is lower in temperature than the high-temperature coolant. The low-temperature radiator is configured to cool the low-temperature coolant. The water-cooled intercooler includes an in-cooler high-temperature water passage, an in-cooler low-temperature water passage and an in-cooler intake passage. The in-cooler high-temperature water passage is part of the high-temperature coolant circulation loop. The in-cooler low-temperature water passage is part of the low-temperature coolant circulation loop. The in-cooler intake passage is part of the intake passage. The intercooler is configured to exchange heat between intake air of the internal combustion engine and both the high-temperature coolant and the low-temperature coolant. The intercooler is configured to transfer heat of the high-temperature coolant to the low-temperature coolant via intake air. The compressor includes an in-compressor passage that is part of the low-temperature coolant circulation loop. The in-compressor passage is arranged in the low-temperature coolant circulation loop at a location at which the low-temperature coolant that exits from the in-cooler low-temperature water passage is introduced into the in-compressor passage without passing through the low-temperature radiator during a predetermined period from beginning of cold start of the internal combustion engine. The electronic control unit is configured to drive the low-temperature water pump during the predetermined period such that a flow rate of the low-temperature coolant that flows through the low-temperature coolant circulation loop is higher than the flow rate after the predetermined period.

In the engine system, the internal combustion engine may further include a heat source device. The heat source device may have an in-device passage that is part of the bypass passage. The heat source device may be usable as a heat source for the low-temperature coolant. The low-temperature coolant circulation loop may include a bypass passage that bypasses the in-cooler low-temperature water passage. The in-compressor passage may be arranged in the bypass passage at a portion downstream of the in-device passage. The low-temperature coolant circulation loop may include a branch passage and a passage selector valve. The branch passage may connect a portion between a downstream end of the bypass passage and the in-cooler low-temperature water passage with a portion between the in-device passage and the in-compressor passage. The passage selector valve may be configured to change a proportion of the flow rate of the low-temperature coolant that flows into the compressor via the branch passage within the low-temperature coolant that has passed through the intercooler. The electronic control unit may be configured to control the passage selector valve during the predetermined period such that the proportion of the flow rate of the low-temperature coolant is higher than the proportion after the predetermined period.

In the engine system, the electronic control unit may be configured to, during the predetermined period, control the passage selector valve such that all the low-temperature coolant that has passed through the intercooler flows into the compressor via the branch passage, and the electronic control unit may be configured to control the passage selector valve after the predetermined period such that all the low-temperature coolant that has passed through the intercooler does not pass through the branch passage.

In the engine system, the low-temperature coolant circulation loop may include a bypass passage that bypasses the in-cooler low-temperature water passage. The internal combustion engine may further include a heat source device. The heat source device may have an in-device passage that is part of the bypass passage. The heat source device may be usable as a heat source for the low-temperature coolant. The in-compressor passage may be located at a portion at which both the low-temperature coolant that flows out from the in-cooler low-temperature water passage and the low-temperature coolant that flows out from the bypass passage flow.

In the engine system, the compressor may be a compressor of a turbocharger. The in-device passage may be a passage that flows the low-temperature coolant through a bearing of the turbocharger.

In the engine system, the predetermined period may be a period until a change in the temperature of the high-temperature coolant falls within a predetermined range after beginning of cold start.

In the engine system, the predetermined period may be a period until a wall temperature of the intake passage downstream of the compressor reaches a dew point of intake air containing at least one of EGR gas and blow-by gas or until a lapse of a predetermined margin time that begins from the time at which the wall temperature has reached the dew point.

With above-described configuration, during the predetermined period from the beginning of cold start of the internal combustion engine, the flow rate of low-temperature coolant that flows through the low-temperature coolant circulation loop is increased as compared to the flow rate after the predetermined period. Thus, in comparison with the case where such an increase in the flow rate is not performed, it is possible to facilitate transfer of heat from high-temperature coolant to low-temperature coolant via intake air inside the intercooler during the predetermined period. Thus, it is possible to advance an increase in the temperature of low-temperature coolant, so the warm-up of the compressor is facilitated as compared to a comparative configuration that utilizes the low-temperature coolant circulation loop that does not utilizes the heat of high-temperature coolant. As a result, the outlet gas temperature of the compressor increases, so it is possible to early increase the wall temperature of the intake passage downstream of the compressor. Therefore, it is possible to reduce production of condensed water in the intake passage downstream of the compressor. The low-temperature coolant circulation loop receives heat supplied from high-temperature coolant via intake air inside the intercooler; however, the low-temperature coolant circulation loop is basically a circulation loop for low-temperature coolant, and is not intended to cool the water jacket of the internal combustion engine. For this reason, even when high-load operation is performed, the temperature of low-temperature coolant that is introduced into the compressor is lower than the temperature of high-temperature coolant during equivalent high-load operation in the comparative configuration in which high-temperature coolant is introduced into the in-compressor passage. Therefore, the configuration according to the present embodiment is superior to the comparative configuration from the viewpoint of reducing accumulation of deposit in the intake passage inside the compressor and downstream of the compressor. As described above, according to the aspect of the disclosure, when a water-cooled compressor is employed, both a reduction in production of condensed water in the intake passage downstream of the compressor and a reduction in accumulation of deposit in the intake passage inside the compressor and downstream of the compressor are achieved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings. However, in the embodiments that will be described below, when the number, quantity, amount, range, or the like, of each element is described, the disclosure is not limited to the described number, quantity, amount, range, or the like, unless otherwise specified or unless obviously specified to the described number, quantity, amount, range, or the like, in theory. Structures, steps, and the like, that will be described below in the embodiments are not always indispensable for the disclosure unless otherwise specified or unless obviously specified to them in theory.

A first embodiment of the disclosure will be described with reference to FIG. 1 to FIG. 6.

Description of System Configuration of First Embodiment

Figure 1:
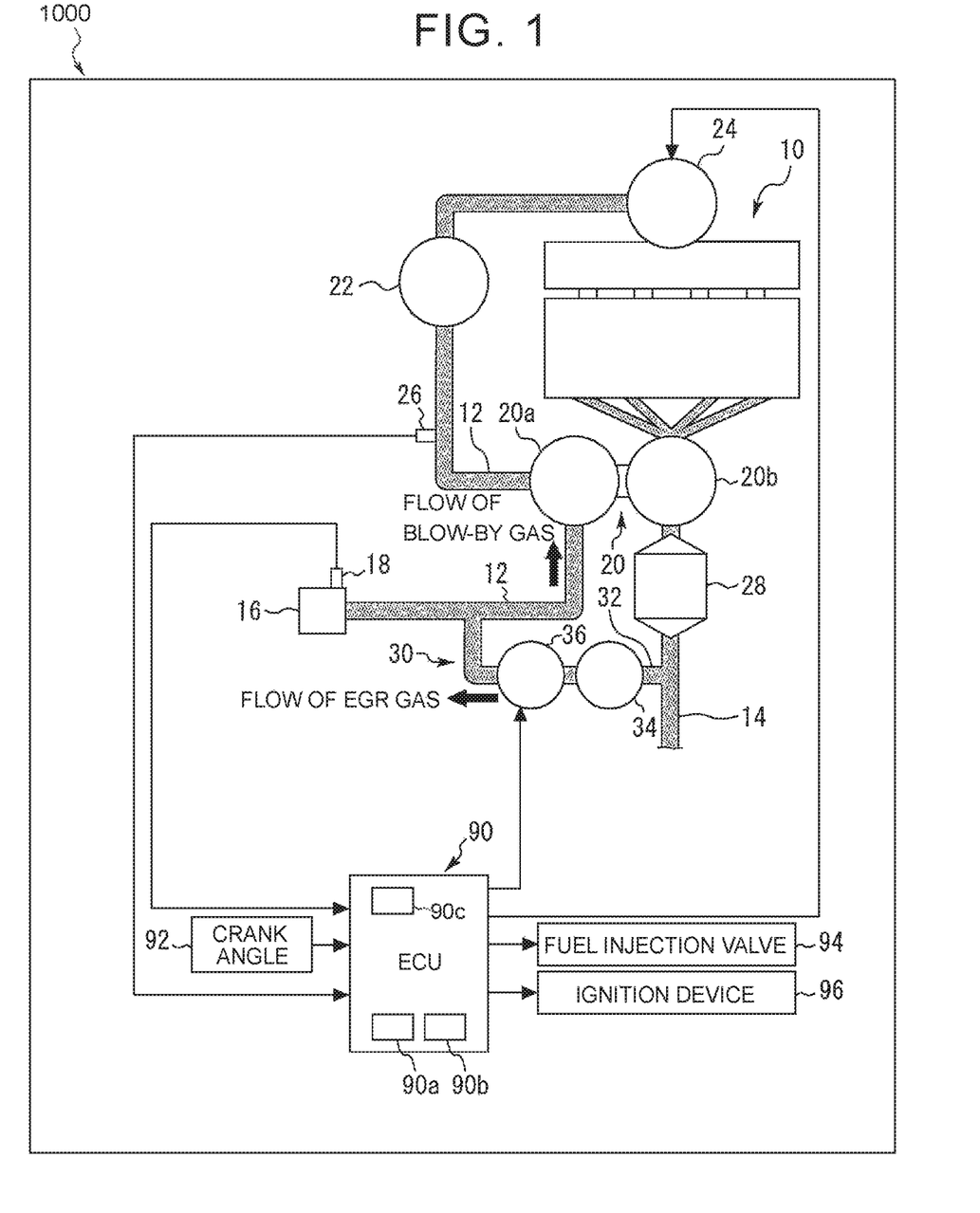
FIG. 1 is a view that schematically shows an example of the configuration of a system according to a first embodiment of the disclosure.

FIG. 1 is a view that schematically shows an example of the configuration of a system according to the first embodiment of the disclosure. The system shown in FIG. 1 includes an internal combustion engine (spark ignition engine as an example) 10. An intake passage 12 and an exhaust passage 14 communicably connected to each cylinder of the internal combustion engine 10.

An air cleaner 16 is connected near the inlet of the intake passage 12. An air flow sensor 18 is provided in the air cleaner 16. The air flow sensor 18 outputs a signal corresponding to the flow rate of air that is taken into the intake passage 12. A compressor 20a of a turbocharger 20 is arranged downstream of the air cleaner 16. On the other hand, a turbine 20b of the turbocharger 20 is arranged in the exhaust passage 14. The compressor 20a is of a water-cooled type. The detailed configuration of the compressor 20a will be described later with reference to FIG. 2.

An intercooler 22 is provided downstream of the compressor 20a. The intercooler 22 is used to cool air compressed by the compressor 20a. The intercooler 22 is of a water-cooled type. The detailed configuration of the intercooler 22 will be described later with reference to FIG. 2. An electronically controlled throttle valve 24 is provided downstream of the intercooler 22. A wall temperature sensor 26 is installed in the intake passage 12 downstream of the compressor 20a and upstream of the intercooler 22. The wall temperature sensor 26 detects the wall temperature Tw of the intake passage 12 downstream of the compressor.

An exhaust emission control catalyst (three-way catalyst as an example) 28 is arranged in the exhaust passage 14 downstream of the turbine 20b. The internal combustion engine 10 shown in FIG. 1 includes a low pressure loop (LPL) EGR loop 30. The EGR loop 30 includes an EGR passage 32 that connects the exhaust passage 14 downstream of the exhaust emission control catalyst 28 with the intake passage 12 upstream of the compressor 20a. An EGR cooler 34 and an EGR valve 36 are provided in the EGR passage 32 in order from the upstream side of the flow of EGR gas at the time when EGR gas is introduced into the intake passage 12. The EGR cooler 34 is provided in order to cool EGR gas flowing through the EGR passage 32. The EGR valve 36 is provided in order to adjust the amount of EGR gas that is returned to the intake passage 12 through the EGR passage 32.

Configuration of Two-line Coolant Circulation Loop

Figure 2:
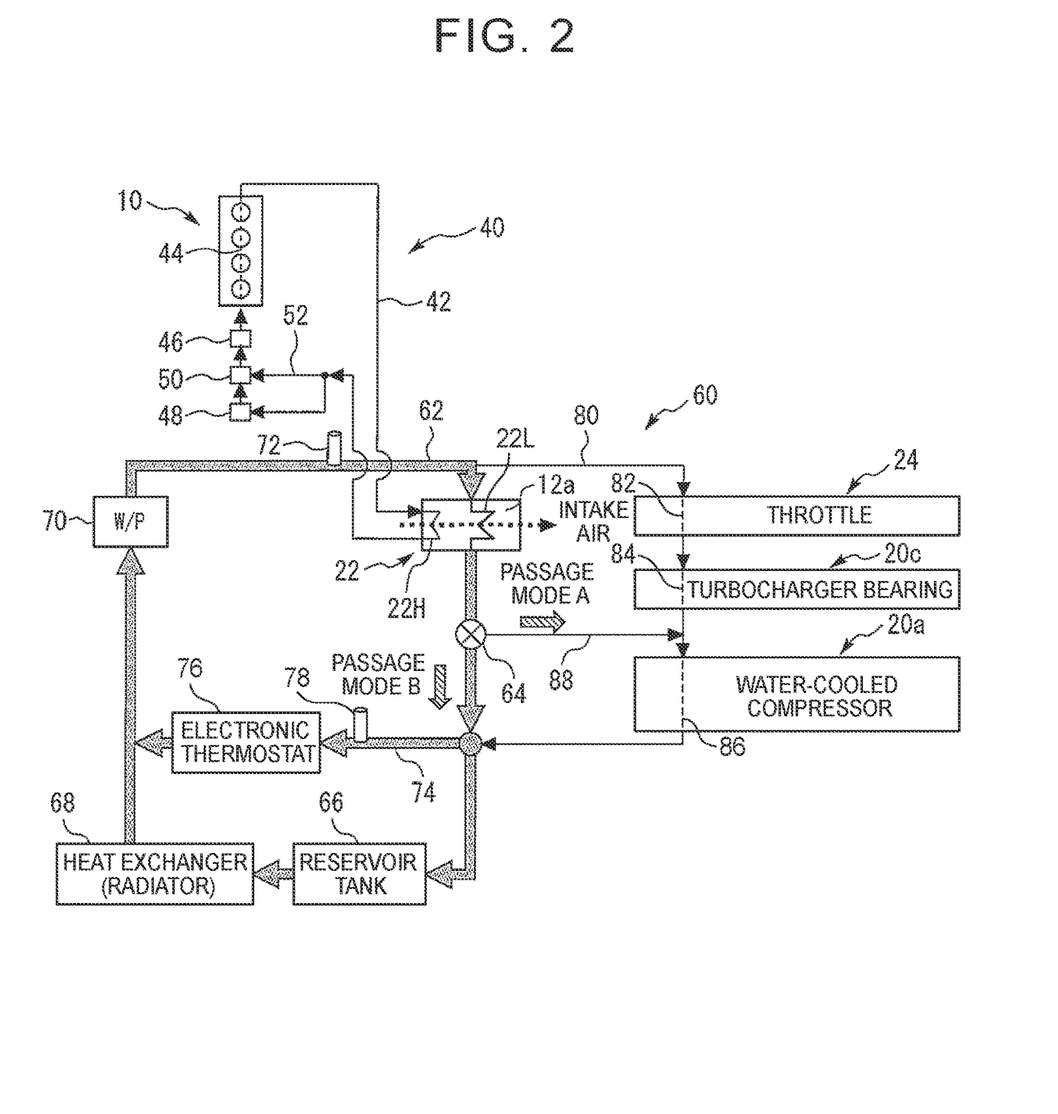
FIG. 2 is a view that schematically shows an example of the configuration of passages of two-line coolant circulation loops provided in an internal combustion engine shown in FIG. 1.

FIG. 2 is a view that schematically shows an example of the configuration of passages of two-line coolant circulation loops 40, 60 provided in the internal combustion engine 10 shown in FIG. 1. The system according to the present embodiment includes the two-line coolant circulation loops 40, 60. Both the two-line coolant circulation loops 40, 60 are independent closed loops, and are allowed to vary the temperatures of circulating coolants. Hereinafter, the coolant circulation loop 40 through which relatively high temperature coolant (hereinafter, referred to as HT coolant) circulates is referred to as HT coolant circulation loop, and the coolant circulation loop 60 through which relatively low temperature coolant (hereinafter, referred to as LT coolant) circulates is referred to as LT coolant circulation loop. HT is an abbreviation of high temperature, and LT is an abbreviation of low temperature. Each of the arrows shown in the passages in FIG. 2 indicates the flow direction of HT coolant or LT coolant.

The HT coolant circulation loop 40 includes an HT main loop 42. The HT main loop 42 includes a passage (water jacket) 44 provided inside the internal combustion engine 10 (more specifically, inside a cylinder block and a cylinder head). In addition, the HT main loop 42 includes an in-cooler high-temperature water passage 22H, an HT water pump 46, an HT radiator 48 and an HT thermostat 50. The in-cooler high-temperature water passage 22H is provided inside the intercooler 22. The in-cooler high-temperature water passage 22H functions as part of the HT coolant circulation loop 40 (HT main loop 42). The HT water pump 46 is, for example, driven by the torque of the crankshaft (not shown) of the internal combustion engine 10, and circulates HT coolant through the HT coolant circulation loop 40.

The HT coolant circulation loop 40 further includes an HT bypass passage 52. The HT bypass passage 52 branches off from the HT main loop 42 at a portion between the in-cooler high-temperature water passage 22H and the HT radiator 48, and merges with the HT main loop 42 at a portion between the HT radiator 48 and the HT water pump 46. In this way, the HT bypass passage 52 is a passage that bypasses the HT radiator 48. The HT thermostat 50 is arranged at the downstream end of the HT bypass passage 52. The HT thermostat 50 switches between an HT non-bypass passage mode and an HT bypass passage mode. In the HT non-bypass passage mode, HT coolant passes through the HT radiator 48. In the HT bypass passage mode, HT coolant does not pass through the HT radiator 48. More specifically, the HT thermostat 50 opens when the temperature of HT coolant has reached a predetermined temperature, and switches the passage mode from the HT bypass passage mode to the HT non-bypass passage mode. When the HT non-bypass passage mode is selected, HT coolant is cooled by utilizing the HT radiator 48.

The LT coolant circulation loop 60 includes an LT main loop 62. The LT main loop 62 includes an in-cooler low-temperature water passage 22L, a passage selector valve 64, a reservoir tank 66, an LT radiator 68, an LT water pump 70 and a temperature sensor 72. The in-cooler low-temperature water passage 22L is provided inside the intercooler 22. The in-cooler low-temperature water passage 22L functions as part of the LT coolant circulation loop 60 (LT main loop 62). The reservoir tank 66 stores surplus LT coolant. The LT radiator 68 cools LT coolant. The LT water pump 70 is of, for example, an electric type, and circulates LT coolant inside the LT coolant circulation loop 60. The LT radiator 68 (and the reservoir tank 66) is arranged in the LT main loop 62 at a portion between the in-cooler low-temperature water passage 22L and the LT water pump 70. The reservoir tank 66 is located upstream of the LT radiator 68. The temperature sensor 72 detects the temperature of LT coolant that flows into the intercooler 22.

The LT coolant circulation loop 60 further includes a first LT bypass passage 74. The first LT bypass passage 74 branches off from the LT main loop 62 at a portion between the in-cooler low-temperature water passage 22L (more specifically, the passage selector valve 64) and the reservoir tank 66, and merges with the LT main loop 62 at a portion between the LT radiator 68 and the LT water pump 70. In this way, the first LT bypass passage 74 is a passage that bypasses the LT radiator 68 (and the reservoir tank 66). An LT thermostat 76 and a temperature sensor 78 are arranged in the first LT bypass passage 74. The LT thermostat 76 switches between a first LT non-bypass passage mode and a first LT bypass passage mode. In the first LT non-bypass passage mode, LT coolant passes through the LT radiator 68. In the first LT bypass passage mode, LT coolant does not pass through the LT radiator 68. When LT coolant is caused to flow through the LT radiator 68 by selecting the first LT non-bypass passage mode, LT coolant is cooled.

More specifically, the LT thermostat 76 is an electronic thermostat. The LT thermostat 76 is able to not only switch the above-described passage mode but also selectively control the proportion of LT coolant that flows through the LT radiator 68 by means of opening degree adjustment based on a command from an ECU 90 (described later). With this configuration, it is possible to adjust the temperature of LT coolant. The temperature sensor 78 detects the temperature of LT coolant that bypasses the LT radiator 68. As long as the LT thermostat 76 is able to switch the passage mode and control the proportion of LT coolant as described above, the LT thermostat 76 may be provided at any location other than the location shown in FIG. 2. For example, the LT thermostat 76 may be provided in the LT main loop 62.

The LT coolant circulation loop 60 further includes a second LT bypass passage 80 (which corresponds to the bypass passage according to the aspect of the disclosure). The second LT bypass passage 80 branches off from the LT main loop 62 at a portion between the in-cooler low-temperature water passage 22L and the LT water pump 70, and merges with the LT main loop 62 at the upstream end of the first LT bypass passage 74. That is, the second LT bypass passage 80 is a passage that bypasses the intercooler 22 (and the passage selector valve 64).

The second LT bypass passage 80 includes a passage 82 inside the throttle valve 24, an in-bearing passage 84 and an in-compressor passage 86. The in-bearing passage 84 is provided inside the housing of the turbocharger 20 in order to cool a bearing (hereinafter, turbocharger bearing) 20c of the turbocharger 20. The in-compressor passage 86 is provided inside the compressor 20a. More specifically, the turbocharger bearing 20c is a bearing that supports the rotary shaft of a compressor impeller and turbine impeller.

Among the above-described passages 82, 84, 86, the passage 82 is located at the most upstream side and the in-bearing passage 84 and the in-compressor passage 86 are located subsequently in this order with respect to the flow of LT coolant in the second LT bypass passage 80. That is, in the second LT bypass passage 80, LT coolant flows in order of the throttle valve 24, the turbocharger bearing 20c and the compressor 20a. In this way, the compressor 20a is located on the downstream side of the turbocharger bearing 20c.

The LT coolant circulation loop 60 further includes a branch passage 88. The branch passage 88 connects a portion between the downstream end of the second LT bypass passage 80 and the in-cooler low-temperature water passage 22L with a portion between the in-bearing passage 84 and the in-compressor passage 86. The above-described passage selector valve 64 is arranged at an LT main loop 62-side end of the branch passage 88.

The passage selector valve 64 is, for example, a three-way valve. The passage selector valve 64 switches between a second LT non-bypass passage mode (which is the same as passage mode A (described later)) and a second LT bypass passage mode (which is the same as passage mode B (described later)). In the second LT non-bypass passage mode, LT coolant that has passed through the intercooler 22 passes through the branch passage 88 and then passes through the compressor 20a. In the second LT bypass passage mode, LT coolant that has passed through the intercooler 22 does not pass through the compressor 20a. In this way, in the present embodiment, the proportion of LT coolant that passes through the branch passage 88 and flows into the compressor 20a within LT coolant that has passed through the intercooler 22 is switched between 100% and 0%.

As shown in FIG. 2, the intercooler 22 includes an in-cooler intake passage 12a that functions as part of the intake passage 12, in addition to the above-described in-cooler high-temperature water passage 22H and in-cooler low-temperature water passage 22L. The intercooler 22 has an internal structure by which heat is allowed to be exchanged in the following mode. That is, the intercooler 22 is configured to exchange heat between intake air of the internal combustion engine 10 and both HT coolant and LT coolant. In addition, the intercooler 22 is configured such that heat of HT coolant is transferred to LT coolant via intake air.

Referring back to FIG. 1, the description of the system configuration will be described. The system shown in FIG. 1 includes the electronic control unit (ECU) 90. The ECU 90 includes a processor 90a, a memory 90b and an input/output interface 90c. The input/output interface 90c acquires sensor signals from various sensors attached to the internal combustion engine 10 or a vehicle 1000 on which the internal combustion engine 10 is mounted, and outputs operation signals to various actuators included in the internal combustion engine 10. The various sensors include not only the above-described air flow sensor 18, and the like, but also a crank angle sensor 92, and the like. The crank angle sensor 92 detects an engine rotation speed. The various actuators include not only the above-described throttle valve 24, EGR valve 36, HT water pump 46, passage selector valve 64, LT water pump 70 and LT thermostat 76 but also a fuel injection valve 94, an ignition device 96, and the like. The memory 90b stores various control programs and maps for controlling the internal combustion engine 10. The processor 90a reads the control programs from the memory 90b and executes the control programs. Thus, the functions of the controller for the internal combustion engine are implemented.

Temperature Control over LT Coolant

The ECU 90 executes control for bringing the temperature of LT coolant close to a predetermined target temperature. The target temperature is determined from the viewpoint of controlling an intake air temperature in order to reduce knocking of the internal combustion engine 10. The target temperature depends on the specifications of an internal combustion engine or the specifications of a vehicle 1000 on which the internal combustion engine is mounted. Specifically, the ECU 90 adjusts the opening degree of the LT thermostat 76 such that the temperature of LT coolant, which is detected by the temperature sensor 78, approaches the target temperature. More specifically, during the warm-up of the internal combustion engine 10, that is, when the temperature of LT coolant is low, the opening degree of the LT thermostat 76 is set to a fully open state in order to reduce the flow of LT coolant that passes through the LT radiator 68. After the warm-up of the internal combustion engine 10 has proceeded and the temperature of LT coolant has reached the target temperature, the flow rate of LT coolant that passes through the LT radiator 68 is controlled by adjusting the opening degree of the LT thermostat 76 in order to keep the target temperature.

Challenge to Cool Compressor with Coolant

In the early stage after the beginning of cold start, the intake air temperature at the outlet of the compressor is low because the temperature of the compressor that supercharges intake air is low, with the result that the wall temperature Tw of the intake passage downstream of the compressor is low. When EGR gas is introduced to the upstream side of the compressor in this state, moisture contained in EGR gas is cooled in the intake passage downstream of the compressor. If the moisture is cooled to a temperature lower than or equal to its dew point, condensed water is produced. On the other hand, if the temperature of the compressor becomes excessively high at the time of high-load operation after warm-up, hydrocarbon (HC) components contained in EGR gas are warmed by high-temperature intake air supercharged by the compressor. As a result, there is a concern that HC components accumulate as a deposit on the wall face of intake passage inside the compressor and the wall face of the intake passage downstream of the compressor.

In order to reduce production of the above-described condensed water, it is conceivable to quickly increase the temperature of the compressor by utilizing high-temperature coolant (which corresponds to HT coolant in the present embodiment) that flows inside the internal combustion engine (water jacket). The configuration that the in-compressor passage is connected in the circulation loop through which HT coolant flows will be considered. Such a configuration (hereinafter, for the sake of convenience of description, referred to as comparative configuration A) is obtained by, for example, arranging an in-cooler high-temperature water passage of an intercooler that utilizes only HT coolant instead of the in-cooler high-temperature water passage 22H in the HT coolant circulation loop 40 shown in FIG. 2 and arranging the in-cooler high-temperature water passage and the in-compressor passage in parallel with each other.

Figure 3:
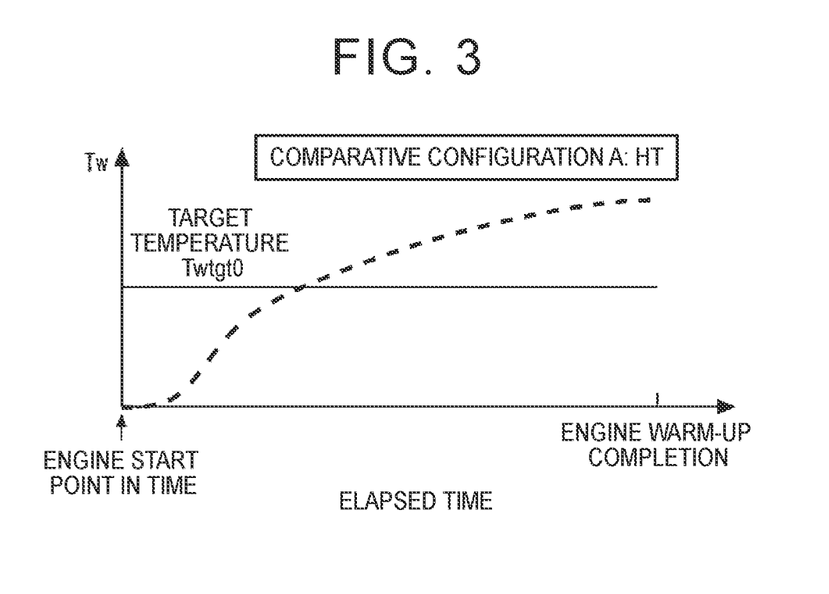
FIG. 3 is a timing chart that shows changes in a wall temperature of an intake passage downstream of a compressor during a period from cold start point in time to point in time at which the warm-up of individual parts of the internal combustion engine has sufficiently proceeded in comparative configuration A in which only high-temperature (HT) coolant is utilized in order to manage the temperature of the compressor.

FIG. 3 is a timing chart that shows changes in the wall temperature Tw of the intake passage downstream of the compressor during a period from cold start point in time to point in time at which the warm-up of individual parts of the internal combustion engine has sufficiently proceeded in comparative configuration A in which only HT coolant is utilized in order to manage the temperature of the compressor. A temperature Twtgt( ) shown in FIG. 3 is a target temperature of the wall temperature Tw of the intake passage downstream of the compressor. The target temperature Twtgt( ) is a value corresponding to the dew point of intake air containing EGR gas. HT coolant is warmed by heat that is generated by the internal combustion engine. For this reason, the wall temperature Tw becomes higher than the target temperature Twtgt( ) at relatively early timing as shown in FIG. 3 during engine warm-up. Therefore, comparative configuration A in which only HT coolant is utilized in order to manage the temperature of the compressor is excellent at warming up the wall face of the intake passage downstream of the compressor. However, with comparative configuration A, the temperature of the compressor tends to be high during high-load operation, that is, when the temperature of HT coolant is high. For this reason, the capacity of cooling the compressor during high load decreases. As the temperature of the compressor increases, the outlet gas temperature of the compressor also increases, so compressor efficiency decreases. As a result, from the viewpoint of reducing accumulation of the above-described deposit during high-load operation and the viewpoint of improving compressor efficiency, comparative configuration A is inferior to comparative configuration B (described later).

Next, the configuration (hereinafter, for the sake of convenience of description, referred to as comparative configuration B) in which only LT coolant is utilized without utilizing heat transferred from HT coolant in order to manage the temperature of the compressor will be described. Comparative configuration B is, for example, obtained by arranging an in-cooler low-temperature water passage of an intercooler that utilizes LT coolant instead of the in-cooler low-temperature water passage 22L in the LT coolant circulation loop 60 shown in FIG. 2 and removing the passage selector valve 64 and the branch passage 88 from the LT coolant circulation loop 60.

Figure 4:
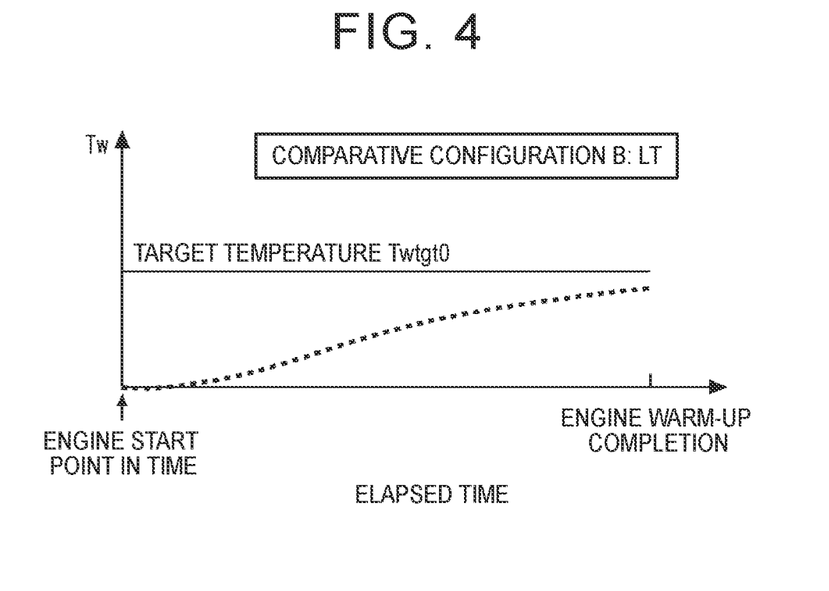
FIG. 4 is a timing chart that shows changes in the wall temperature of the intake passage downstream of the compressor during the period from cold start point in time to point in time at which the warm-up of individual parts of the internal combustion engine has sufficiently proceeded in comparative configuration B in which only low-temperature (LT) coolant is utilized in order to manage the temperature of the compressor.

FIG. 4 is a timing chart that shows changes in the wall temperature Tw of the intake passage downstream of the compressor during the period from cold start point in time to point in time at which the warm-up of individual parts of the internal combustion engine has sufficiently proceeded in comparative configuration B in which only LT coolant is utilized in order to manage the temperature of the compressor. With comparative configuration B, heat is transferred from a device (turbocharger bearing) provided in the LT coolant circulation loop to LT coolant; however, different from HT coolant that is able to utilize heat that is generated by the internal combustion engine, the temperature of LT coolant is difficult to increase during engine warm-up. For such a reason, in the example shown in FIG. 4, the wall temperature Tw of the intake passage downstream of the compressor has not reached the target temperature Twtgt( ) during engine warm-up. Therefore, with comparative configuration B in which only LT coolant is utilized in order to manage the temperature of the compressor, the ability to warm up the intake passage downstream of the compressor is not high, so there is a concern of production of condensed water. On the other hand, with LT coolant that does not receive heat supplied from the water jacket of the internal combustion engine, the capacity of cooling the compressor during high-load operation is higher than that of HT coolant. For this reason, from the viewpoint of reducing accumulation of the above-described deposit and the viewpoint of improving the efficiency of the compressor, comparative configuration B is superior to comparative configuration A.

Characteristic of LT Coolant Control According to First Embodiment

Different from comparative configuration A or comparative configuration B described above, the intercooler 22 included in the internal combustion engine 10 according to the present embodiment has such a structure that heat from HT coolant is allowed to be transferred to LT coolant via intake air and the intercooler 22 is arranged in the LT coolant circulation loop 60. In the present embodiment that utilizes such a configuration, the following control is executed after the beginning of cold start.

Figure 5:
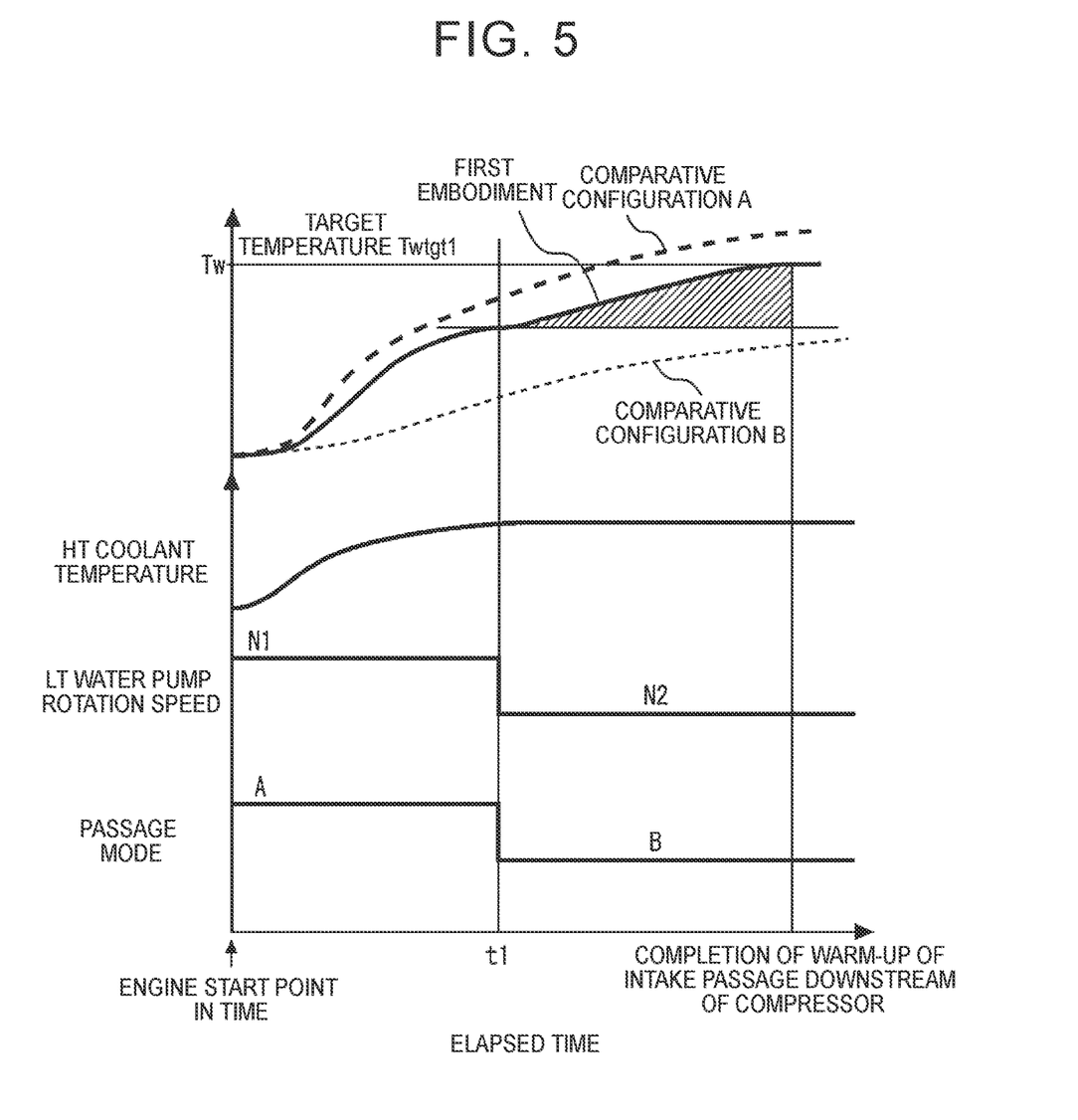
FIG. 5 is a timing chart that shows the outline of characteristic control in the first embodiment of the disclosure.

FIG. 5 is a timing chart that shows the outline of characteristic control according to the first embodiment of the disclosure. In the present embodiment, as shown in FIG. 5, as cold start begins, the passage selector valve 64 is controlled such that passage mode A is obtained. In passage mode A, LT coolant that has passed through the intercooler 22 passes through the branch passage 88 and then passes through the compressor 20a. The LT water pump 70 is controlled such that the rotation speed of the LT water pump 70 becomes an initial rotation speed N1. The initial rotation speed N1 is set so as to be higher than a normal rotation speed N2. The normal rotation speed N2 is basically used after the warm-up of individual parts of the internal combustion engine 10 has completed. The normal rotation speed N2 is such a rotation speed at which, after completion of the warm-up of individual parts of the internal combustion engine 10, the wall temperature Tw is kept at a target temperature Twtgt1 (described later).

As shown in FIG. 5, the temperature of HT coolant increases with a lapse of time after the beginning of cold start. After that, the HT thermostat 50 operates, and cooling of HT coolant by the HT radiator 48 is started. Accordingly, the temperature of HT coolant becomes stable as shown in FIG. 5. When the high-load operation of the internal combustion engine 10 is performed thereafter, the temperature of HT coolant increases from the stable temperature as shown in FIG. 5.

Time t1 in FIG. 5 corresponds to time at which a change in the temperature of HT coolant falls within a predetermined range after the beginning of cold start (that is, time at which the temperature of HT coolant becomes stable). Inside the intercooler 22, the heat of HT coolant is transferred to LT coolant via intake air. For this reason, during a period before time t1, the temperature of LT coolant increases with an increase in the temperature of HT coolant. During the period before time t1, passage mode A is selected. In passage mode A, LT coolant that has passed through the intercooler 22 flows into the compressor 20a together with LT coolant that has passed through the turbocharger bearing 20c. That is, LT coolant that receives heat supplied from HT coolant is introduced into the compressor 20a.

With this configuration that the heat of HT coolant is utilized in order to warm up LT coolant as described above, in comparison with comparative configuration B in which the heat of HT coolant is not utilized, it is possible to quickly increase the wall temperature Tw (in other words, with the characteristic close to comparative configuration A in which only HT coolant is utilized) as shown in FIG. 5.

More specifically, during the period before time t1, the flow rate of LT coolant that flows through the LT coolant circulation loop 60 during the period is increased as compared to the flow rate after time t1 by increasing the rotation speed of the LT water pump 70 to the initial rotation speed N1. Thus, since the flow rate of LT coolant that passes through the intercooler 22 and flows to the compressor 20a increases, it is possible to facilitate heat transfer from HT coolant to LT coolant via intake air inside the intercooler 22 in comparison with the case where the flow rate is small. This leads to early warm-up of the compressor 20a, so this contributes to a quick increase in wall temperature Tw. During the period before time t1, passage mode A is selected, so it is possible to supply all the LT coolant that has passed through the intercooler 22 to the compressor 20a. Thus, it is possible to maximally utilize LT coolant that increases in temperature by utilizing the heat of HT coolant during the period. This also leads to early warm-up of the compressor 20a, so this contributes to a quick increase in wall temperature Tw.

As shown in FIG. 5, an increase in the temperature of HT coolant becomes gentler toward time t1. Accordingly, an increase in the wall temperature Tw also becomes gentler. At time t1, the rotation speed of the LT water pump 70 is decreased from the initial rotation speed N1 to the normal rotation speed N2. In addition, the passage selector valve 64 is controlled such that passage mode B is selected. In passage mode B, LT coolant that has passed through the intercooler 22 does not pass through the compressor 20a.

As described above, with control during the period from time t1, the rotation speed of the LT water pump 70 is decreased to the normal rotation speed N2 in advance of completion of the warm-up of individual parts of the internal combustion engine 10. The turbocharger bearing 20c located upstream of the compressor 20a generates heat during operation of the internal combustion engine 10. For this reason, with the above-described control, it is possible to further effectively utilize the turbocharger bearing 20c as a heat source in comparison with the case where the rotation speed is not decreased. Thus, it is possible to increase the temperature of LT coolant that flows out from the turbocharger bearing 20c, so it is possible to facilitate the warm-up of the compressor 20a. As a result, as indicated by the hatching in FIG. 5, it is possible to further increase the wall temperature Tw during the period from time t1.

With the control during the period from time t1, passage mode B is selected, so only LT coolant that has passed through the turbocharger bearing 20c is introduced into the compressor 20a. That is, all the LT coolant that has passed through the intercooler 22 is not introduced into the compressor 20a. After an increase in the temperature of HT coolant has stopped at time t1, a further increase in the temperature of LT coolant utilizing HT coolant becomes more difficult. Therefore, at time t1, by stopping supply of LT coolant that has passed through the intercooler 22 to the compressor 20a, it is possible to stop mixing of LT coolant of which an increase in temperature has stopped with LT coolant from the turbocharger bearing 20c. That is, it is possible to supply the compressor 20a with LT coolant from the turbocharger bearing 20c without decreasing the temperature of LT coolant from the turbocharger bearing 20c with LT coolant from the intercooler 22. This also contributes to a further increase in the temperature of LT coolant utilizing the heat of the turbocharger bearing 20c, so it is possible to facilitate the warm-up of the compressor 20a. For this reason, by switching the passage to passage mode B as well, it is possible to further increase the wall temperature Tw during the period from time t1 as indicated by the hatching in FIG. 5.

The target temperature Twtgt1 shown in FIG. 5, as well as the value Twtgt( ) shown in FIG. 3 and FIG. 4, is a value corresponding to the dew point of intake air containing EGR gas. The target temperature Twtgt1 varies depending on an outside air condition (the temperature and humidity of outside air) and an engine operating condition (an engine rotation speed, an engine load, and the like). Therefore, the target temperature Twtgt1 is determined in advance in consideration of the hardest outside air condition and engine operating condition that are assumed during operation of the internal combustion engine 10 in terms of production of condensed water. The target temperature Twtgt1 may be the dew point of intake air containing EGR gas or may be a value higher by a predetermined margin than the dew point.

As described above with reference to FIG. 5, by combining the control during the period from time t1 with the control before time t1, it is possible to further increase the wall temperature Tw during the period from time t1 as indicated by the hatching in FIG. 5. That is, with such a combination of the controls, in an internal combustion engine (vehicle) having specifications that require the high target temperature Twtgt1 in order to reduce production of condensed water (in other words, specifications that require a high ability to warm up the intake passage 12), it is possible to increase the wall temperature Tw such that the high target temperature Twtgt1 is satisfied as in the case of the example shown in FIG. 5.

When the wall temperature Tw reaches the target temperature Twtgt1 (that is, when the wall temperature Tw increases to a value corresponding to the dew point of intake air containing EGR gas), the warm-up of the intake passage 12 downstream of the compressor completes. In the present embodiment, after the warm-up of the intake passage 12 has completed in this way as well, control during the period from time t1 is continued. That is, the rotation speed of the LT water pump 70 is controlled to the normal rotation speed N2, and passage mode B is selected.

In the present embodiment, the LT coolant circulation loop 60 for cooling the compressor 20a receives heat supplied from HT coolant via intake air inside the intercooler 22; however, the LT coolant circulation loop 60 is basically a circulation loop for LT coolant, and is not intended to cool the (water jacket 44 of) the internal combustion engine 10. For this reason, even when high-load operation is performed after engine warm-up (after not only the warm-up of the intake passage 12 but also the warm-up of individual parts of the internal combustion engine 10 has completed), the temperature of LT coolant that is introduced into the compressor 20a is lower than the temperature of HT coolant in comparative configuration A during equivalent high-load operation. For this reason, the configuration of the present embodiment is superior to comparative configuration A from the viewpoint of reducing accumulation of deposit in the intake passage 12 inside the compressor 20a and downstream of the compressor.

As described above, with the LT coolant circulation loop 60 according to the present embodiment that accompanies the above-described characteristic control, when the water-cooled compressor 20a is employed, both a reduction in production of condensed water in the intake passage 12 downstream of the compressor and a reduction in accumulation of deposit in the intake passage 12 inside the compressor 20a and downstream of the compressor are suitably achieved. Furthermore, since the outlet gas temperature of the compressor 20a during high-load operation is reduced as compared to comparative configuration A, improvement of compressor efficiency is also possible in addition to a reduction in production of condensed water and a reduction in accumulation of deposit.

Figure 6:
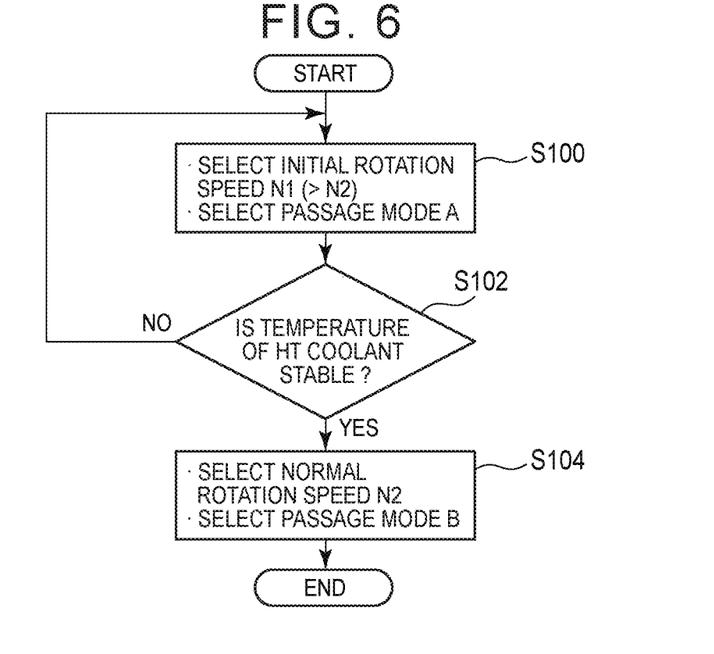
FIG. 6 is a flowchart that shows an example of a processing routine associated with control over an LT water pump and a passage selector valve in the first embodiment of the disclosure.

FIG. 6 is a flowchart that shows an example of a processing routine associated with control over the LT water pump 70 and the passage selector valve 64 according to the first embodiment of the disclosure. This routine is started up when cold start of the internal combustion engine 10 begins. Cold start means a start that is performed in a state where the internal combustion engine 10 is cold and has a temperature lower than or equal to an outside air temperature.

As the routine shown in FIG. 6 is started up as a result of cold start, the ECU 90 initially executes the process of step S100. In step S100, the LT water pump 70 is controlled such that the rotation speed of the LT water pump 70 becomes the initial rotation speed N1 (>the normal rotation speed N2), and the passage selector valve 64 is controlled such that passage mode A is selected.

Subsequently, the ECU 90 determines whether the temperature of HT coolant becomes stable after the beginning of cold start (step S102). Specifically, it is determined whether a change in the temperature of HT coolant falls within a predetermined range after the beginning of cold start. As a result, while this determination is negative, the ECU 90 repeatedly executes the process of step S100.

On the other hand, when it is determined in step S102 that the temperature of HT coolant is stable, the ECU 90 executes the process of step S104. In step S104, the LT water pump 70 is controlled such that the rotation speed of the LT water pump 70 becomes the normal rotation speed N2, and the passage selector valve 64 is controlled such that passage mode B is selected.

By applying the control according to the routine shown in FIG. 6 to the LT coolant circulation loop 60 shown in FIG. 2, it is possible to suitably achieve both a reduction in production of condensed water in the intake passage 12 downstream of the compressor and a reduction in accumulation of deposit in the intake passage 12 inside the compressor 20a and downstream of the compressor as described with reference to FIG. 5.

Next, a second embodiment of the disclosure will be described with reference to FIG. 7 to FIG. 9.

Description of System Configuration of Second Embodiment

Figure 7:
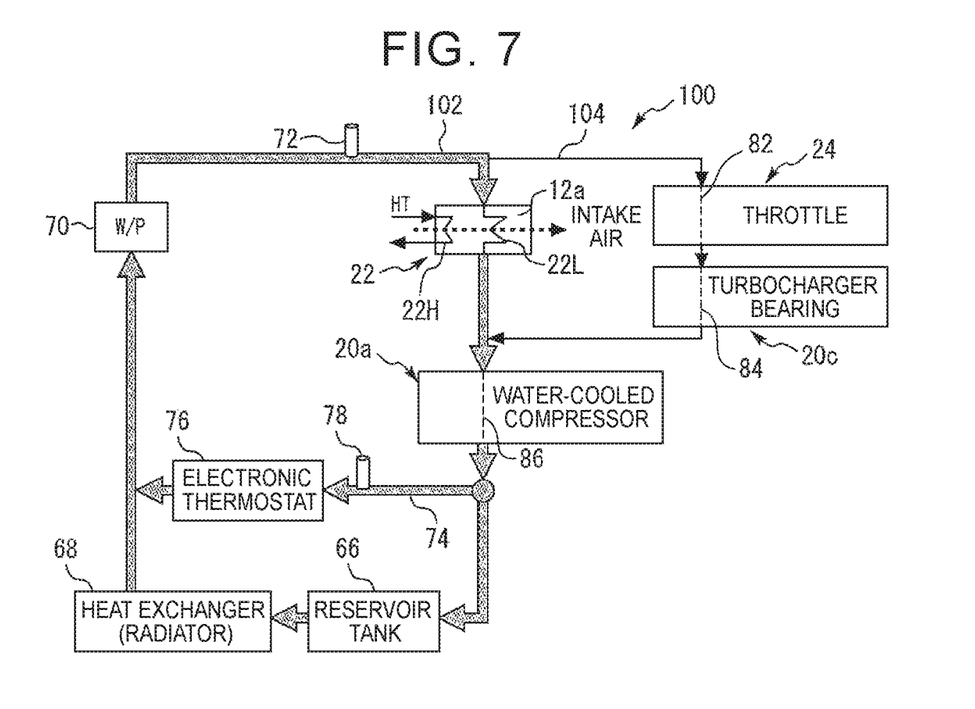
FIG. 7 is a view that schematically shows an example of the configuration of passages of an LT coolant circulation loop according to a second embodiment of the disclosure.

The system according to the present embodiment includes an internal combustion engine that is different from the internal combustion engine 10 in that an LT coolant circulation loop 100 shown in FIG. 7 is provided instead of the LT coolant circulation loop 60. The system according to the present embodiment is the same as that of the first embodiment in that temperature control is executed by using the LT thermostat 76 in order to bring the temperature of LT coolant close to the predetermined target temperature.

FIG. 7 is a view that schematically shows an example of the configuration of passages of an LT coolant circulation loop 100 according to the second embodiment of the disclosure. In FIG. 7, the HT coolant circulation loop 40 is not shown except part of the HT coolant circulation loop 40. In FIG. 7, like reference numerals denote the same components as those shown in FIG. 2, and the description thereof is omitted or simplified.

The LT coolant circulation loop 100 includes an LT main loop 102. As shown in FIG. 7, the intercooler 22, the compressor 20a, the reservoir tank 66, the LT radiator 68, the LT water pump 70 and the temperature sensor 72 are arranged in the LT main loop 102. The first LT bypass passage 74 is connected to the LT main loop 102 as a passage that bypasses the LT radiator 68 (and the reservoir tank 66).

The LT coolant circulation loop 100 further includes a second LT bypass passage 104 (which corresponds to the bypass passage according to the aspect of the disclosure). The second LT bypass passage 104 branches off from the LT main loop 102 at a portion between the in-cooler low-temperature water passage 22L and the LT water pump 70, and merges with the LT main loop 102 at a portion between the intercooler 22 and the compressor 20a. In this way, the second LT bypass passage 104 is a passage that bypasses the intercooler 22. The second LT bypass passage 104 includes the passage 82 inside the throttle valve 24 and the in-bearing passage 84 of the turbocharger bearing 20c in order from the upstream side of the flow of LT coolant.

In the above-described LT coolant circulation loop 100 shown in FIG. 7, the in-compressor passage 86 is located at a portion at which LT coolant that flows out from the in-cooler low-temperature water passage 22L and LT coolant that flows out from the second LT bypass passage 80 flow. For this reason, with the LT coolant circulation loop 100, LT coolant from the intercooler 22 and LT coolant from the turbocharger bearing 20c merge with each other, and the resultant LT coolant is then introduced into the compressor 20a. This passage mode corresponds to passage mode A shown in FIG. 2. The LT coolant circulation loop 100, different from the LT coolant circulation loop 60, does not include the passage selector valve 64 or the branch passage 88. Therefore, in the present embodiment, passage mode A is constantly selected. The proportion of the flow rate of LT coolant from the intercooler 22 and the flow rate of LT coolant from the turbocharger bearing 20c depends on passage resistance.

Characteristic of LT Coolant Control According to Second Embodiment

In the present embodiment as well, the following control is executed after the beginning of cold start by utilizing the intercooler 22 including a structure that allows heat from HT coolant to be transferred to LT coolant via intake air. FIG. 8 is a timing chart that shows the outline of characteristic control in the second embodiment of the disclosure.

Figure 8:
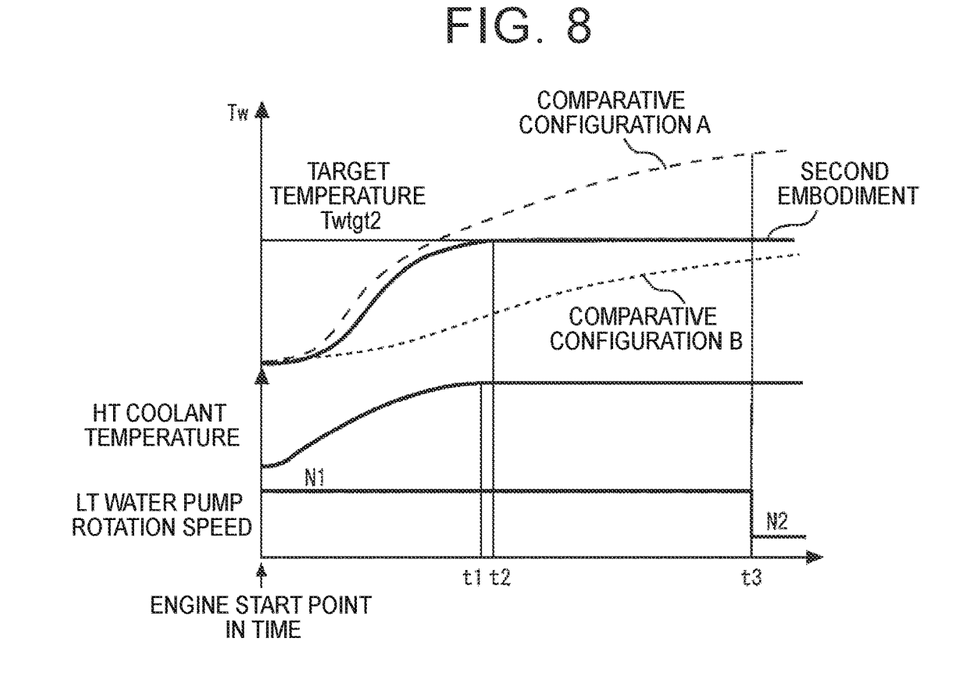
FIG. 8 is a timing chart that shows the outline of characteristic control in the second embodiment of the disclosure.

As cold start begins, the LT water pump 70 is controlled such that the rotation speed of the LT water pump 70 becomes the initial rotation speed N1 as shown in FIG. 8. The configuration that the wall temperature Tw is quickly increased by heat supplied from HT coolant to LT coolant during the period before time t1 at which the temperature of HT coolant becomes stable is the same as the configuration of the first embodiment.

In the example shown in FIG. 8, at time t2 just after time t1, the wall temperature Tw reaches a target temperature Twtgt2. The target temperature Twtgt2 is lower than the target temperature Twtga according to the first embodiment. That is, the specifications of the internal combustion engine (vehicle) according to the present embodiment require a lower ability to warm up the intake passage 12 than the specifications of the internal combustion engine 10 (vehicle) according to the first embodiment. For this reason, in the example shown in FIG. 8, at time t2 close to time t1 at which HT coolant becomes stable, the target temperature Twtgt2 is achieved (that is, the warm-up of the intake passage 12 downstream of the compressor completes).

Time t3 after time t2 corresponds to time at which the warm-up of individual parts of the internal combustion engine has sufficiently completed after the wall temperature Tw has reached the target temperature Twtgt2. In the present embodiment, at time t3, the rotation speed of the LT water pump 70 is decreased from the initial rotation speed N1 to the normal rotation speed N2.

As described in the first embodiment, after an increase in the temperature of HT coolant has stopped at time t1, a further increase in the temperature of LT coolant utilizing HT coolant becomes difficult. Therefore, the timing at which the rotation speed of the LT water pump 70 is decreased to the normal rotation speed N2 may be time t2 at which the wall temperature Tw reaches the target temperature Twtgt2. On the other hand, when the normal rotation speed N2 is selected immediately at time t2 (that is, when transfer of heat from HT coolant to LT coolant via intake air is reduced), there is a concern that the warm-up of another intended warm-up component (in the example shown in FIG. 7, the throttle valve 24) delays. In the present embodiment, the normal rotation speed N2 is selected at time t3 as described above.

As described above, during the period before time t1, the rotation speed of the LT water pump 70 is increased to the initial rotation speed N1. Thus, even when the LT coolant circulation loop 100 shown in FIG. 7 is employed as an object, it is possible to early warm up the compressor 20a, and it is possible to quickly increase the wall temperature Tw, as in the case of the first embodiment. Furthermore, in the present embodiment that employs the internal combustion engine (vehicle) that requires the low target temperature Twtgt2, it is possible to quickly increase the wall temperature Tw to the target temperature Twtgt2 with the above-described control over the rotation speed of the LT water pump 70. Since LT coolant is utilized in order to cool the compressor 20a, the present embodiment is superior to comparative configuration A from the viewpoint of a reduction in accumulation of deposit in the intake passage 12 inside the compressor 20a and downstream of the compressor.

As described above, with the LT coolant circulation loop 100 according to the present embodiment that provides the above-described characteristic control as well, both a reduction in production of condensed water in the intake passage 12 downstream of the compressor and a reduction in accumulation of deposit in the intake passage 12 inside the compressor 20a and downstream of the compressor are suitably achieved. It is also possible to improve compressor efficiency. Furthermore, when the LT coolant circulation loop 100 is used, it is not possible to set the target temperature Twtgt to a higher value than when the LT coolant circulation loop 60 according to the first embodiment is used. However, both a reduction in production of condensed water and a reduction in accumulation of deposit are achieved without providing the passage selector valve 64 (that is, with a simpler configuration).

Figure 9:
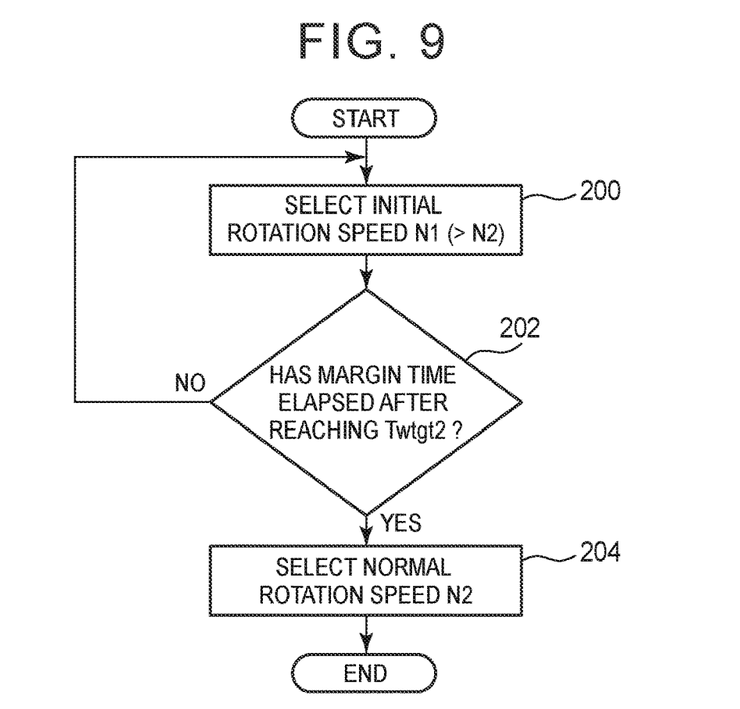
FIG. 9 is a flowchart that shows an example of a processing routine associated with control over an LT water pump according to the second embodiment of the disclosure.

FIG. 9 is a flowchart that shows an example of a processing routine associated with control over the LT water pump 70 according to the second embodiment of the disclosure. This routine, as well as the routine shown in FIG. 6, is started up at the time when cold start of the internal combustion engine 10 begins.

In the routine shown in FIG. 9, the ECU 90 initially executes the process of step 200. In step 200, the LT water pump 70 is controlled such that the rotation speed of the LT water pump 70 becomes the initial rotation speed N1 (>the normal rotation speed N2).

Subsequently, the ECU 90 determines whether a predetermined margin time has elapsed from when the wall temperature Tw has reached the target temperature Twtgt2 (step 202). This determination corresponds to determining whether time t3 in the timing chart shown in FIG. 8 has come. In step 202, as described above, it may also be determined whether the wall temperature Tw has reached the target temperature Twtgt2 only.

In step 202, whether the wall temperature Tw has reached the target temperature Twtgt2 (that is, whether the wall temperature Tw has reached the dew point of intake air containing EGR gas) may be determined by using the wall temperature sensor 26. This determination may be made while estimating the wall temperature Tw by utilizing a compressor outlet gas temperature sensor or a temperature sensor that detects the temperature of intake air that flows through the intake passage 12 downstream of the compressor, instead of the wall temperature sensor 26. The margin time is determined in advance so as to include a period of time from time t2 at which the wall temperature Tw reaches the target temperature Twtgt2 to time t3 at which the warm-up of individual parts (in the present embodiment, the throttle valve 24) of the internal combustion engine completes. The determination as to whether the margin time has elapsed is not limited to the example in which a value determined in advance is used. That is, for example, a temperature sensor that detects the temperature of an objective component (in the present embodiment, the throttle valve 24) may be provided, and the determination may be made by determining whether time corresponding to time t3 has come by using the temperature sensor.

While the determination of step 202 is negative, the ECU 90 repeatedly executes the process of step 200. On the other hand, when the determination of step 202 is affirmative, that is, when it is determined that time t3 has come, the ECU 90 executes the process of step 204. In step 204, the LT water pump 70 is controlled such that the rotation speed of the LT water pump 70 becomes the normal rotation speed N2.

By applying the control according to the routine shown in FIG. 9 to the LT coolant circulation loop 100 shown in FIG. 7 as well, it is possible to suitably achieve both a reduction in production of condensed water in the intake passage 12 downstream of the compressor and a reduction in accumulation of deposit in the intake passage 12 inside the compressor 20*a* and downstream of the compressor, as described with reference to FIG. 8.

Incidentally, in the above-described first and second embodiments, the internal combustion engine 10, or the like, in which EGR gas is introduced into the intake passage 12 upstream of the compressor 20*a* is illustrated. However, in a configuration that blow-by gas (that is, gas that leaks into a crankcase via a gap between a piston and a cylinder) other than EGR gas is introduced into the intake passage upstream of the compressor as well, the above-described production of condensed water and accumulation of deposit can occur. For this reason, the control according to the disclosure may be applied to an internal combustion engine in which blow-by gas is introduced into an intake passage upstream of a compressor in addition to or together with EGR gas.

The portion at which the water-cooled compressor is arranged in the low-temperature coolant circulation loop is not always limited to the portion described in the first or second embodiment. That is, as long as the location is such a location that low-temperature coolant that exits from the in-cooler low-temperature water passage is introduced into the in-compressor passage without passing through the low-temperature radiator during a predetermined period from the beginning of cold start of the internal combustion engine, the in-compressor passage that is part of the low-temperature coolant circulation loop may be arranged in the low-temperature coolant circulation loop at any portion other than the above-described portion. That is, the portion at which the in-compressor passage is arranged just needs to be able to introduce low-temperature coolant that has passed through the in-cooler low-temperature water passage into the in-compressor passage without being cooled by the low-temperature radiator during the predetermined period.

In the above-described first embodiment, during the period (which corresponds to the predetermined period according to the aspect of the disclosure) before time t1 at which a change in the temperature of HT coolant falls within a predetermined range (that is, time at which the temperature of HT coolant becomes stable) after the beginning of cold start, all the LT coolant that has passed through the intercooler 22 is introduced into the compressor 20*a* via the branch passage 88. During the period from time t1 (that is, the period after the predetermined period), all the LT coolant that has passed through the intercooler 22 is not introduced into the compressor 20*a*. However, other than the above-described example, when the proportion of the flow rate of low-temperature coolant that flows through the compressor within low-temperature coolant that has passed through the intercooler during the predetermined period is increased as compared to the proportion after the predetermined period if only a little, it may be regarded that it is possible to supply a larger amount of low-temperature coolant warmed up by utilizing the heat of high-temperature coolant to the compressor during the predetermined period. Therefore, the control over the passage selector valve according to the aspect of the disclosure just needs to increase the proportion of the flow rate during the predetermined period as compared to the proportion after the predetermined period.

In the above-described first and second embodiments, the example in which the turbocharger bearing 20*c* is used as the heat source device according to the aspect of the disclosure is described. However, the heat source device is not limited to the turbocharger bearing 20*c* as long as the heat source device is usable as a heat source for LT coolant. That is, for example, the heat source device may be the exhaust emission control catalyst 28 or may be a heat exchanger that exchanges heat between HT coolant and LT coolant at a portion other than the intercooler 22.

In the above-described first and second embodiments, the internal combustion engine 10, or the like, that includes the compressor 20*a* of the turbocharger 20 is illustrated. However, the compressor intended by the disclosure is not limited to the compressor included in the turbocharger as long as the compressor supercharges intake air. That is, for example, the compressor may be a compressor that is driven by utilizing the torque of a crankshaft or may be an electric compressor.

What is claimed is:

1. An engine system comprising:
    an internal combustion engine;
    a turbocharger having a compressor arranged in an intake passage to supercharge intake air of the internal combustion engine and a turbine driven by exhaust gas from the internal combustion engine;
    wherein at least one of EGR gas and blow-by gas is introduced to the intake passage upstream of the compressor;
    coolant circulation loops including:
        a high-temperature coolant circulation loop circulating coolants at different temperatures;
            wherein the high-temperature coolant circulation loop further includes:
                a high-temperature water pump to circulate high-temperature coolant for cooling a water jacket of the internal combustion engine; and
                a high-temperature radiator to cool the high-temperature coolant; and
        a low-temperature coolant circulation loop;
            wherein the low-temperature coolant circulation loop further includes:
                a low-temperature water pump to circulate low-temperature coolant lower than the high-temperature coolant circulating in the high-temperature coolant circulation loop; and
                a low-temperature radiator to cool the low-temperature coolant;
        a water-cooled intercooler to exchange heat between intake air of the internal combustion engine and both the high-temperature coolant and the low-temperature coolant via intake air;
            wherein the water-cooled intercooler further includes:
                an in-cooler high-temperature water passage being a part of the high-temperature coolant circulation loop;
                an in-cooler low-temperature water passage being a part of the low-temperature coolant circulation loop; and
                an in-cooler intake passage being a part of the intake passage;
            wherein the compressor further includes an in-compressor passage being a part of the low-temperature coolant circulation loop, and being arranged in the low-temperature coolant circulation loop at a location at which the low-temperature coolant exiting from the in-cooler low-temperature water passage is introduced into the in-compressor passage without passing through the low-temperature radiator during a predetermined period being defined as from beginning of a cold start phase to a completion of a warm-up phase of the internal combustion engine; and an electronic control unit programmed to drive the low-temperature water pump during the predetermined period in order to cause a flow rate of the low-temperature coolant flowing through the low-temperature coolant circulation loop during the predetermined period to be higher than the flow rate after the predetermined period.

2. The engine system according to claim 1, wherein the low-temperature coolant circulation loop includes a bypass passage that bypasses the in-cooler low-temperature water passage;

wherein the internal combustion engine includes at least one of a turbocharger bearing and exhaust emission control catalyst, useable as a heat source for the low temperature coolant, that includes an in-device passage that is part of the bypass passage;

wherein the in-compressor passage is arranged in the bypass passage at a portion downstream of the in-device passage;

wherein the low-temperature coolant circulation loop includes a branch passage that connects a portion between a downstream end of the bypass passage and the in-cooler low-temperature water passage with a portion between the in-device passage and the in-compressor passage;

wherein a proportion of the flow rate of the low-temperature coolant flowing into the compressor via the branch passage within the low-temperature coolant that has passed through the intercooler is varied via a passage selector valve;

wherein the electronic control unit is further programmed to control the passage selector valve during the predetermined period to cause the proportion of the flow rate of the low-temperature coolant to be higher than the proportion of the flow rate of the low temperature coolant after the predetermined period.

3. The engine system according to claim 2, wherein the electronic control unit is programmed to control the passage selector valve in order to cause all the low-temperature coolant passing through the intercooler to flow into the compressor via the branch passage; and wherein the electronic control unit is programmed to control the passage selector valve after the predetermined period to cause all the low-temperature coolant passing through the intercooler to be supplied to at least one of a reservoir tank and a low temperature thermostat of the low-temperature coolant loop without passing through the branch passage.

4. The engine system according to claim 2, wherein the in-device passage is a passage to supply the low-temperature coolant through a bearing of the turbocharger.

5. The engine system according to claim 1, wherein the low-temperature coolant circulation loop includes a bypass passage bypassing the in-cooler low-temperature water passage;

wherein the internal combustion engine further includes:
  at least one of a turbocharger bearing and exhaust emission control catalyst for heating the low-temperature coolant; and
  an in-device passage being part of the bypass passage; and wherein the in-compressor passage is located at a portion at which both the low-temperature coolant that flows out from the in-cooler low-temperature water passage and the low-temperature coolant that flows out from the bypass passage flow.

6. The engine system according to claim 1, wherein the predetermined period is a period of a change in the temperature of the high-temperature coolant falling within a predetermined range after beginning of cold start.

7. The engine system according to claim 1, wherein the predetermined period is at least one of:
  a period at which a wall temperature of the intake passage downstream of the compressor reaches a dew point of intake air containing at least one of EGR gas and blow-by gas; and
  a period at which a lapse of a predetermined margin time that begins from the period at which the wall temperature has reached the dew point.

* * * * *